No. 844,998. PATENTED FEB. 19, 1907.
J. J. ENGLERT.
TAG WIRING MACHINE.
APPLICATION FILED SEPT. 15, 1905.

WITNESSES:

INVENTOR
Joseph J. Englert,
By Milo B. Stevens & Co.
Attorneys.

No. 844,998. PATENTED FEB. 19, 1907.
J. J. ENGLERT.
TAG WIRING MACHINE.
APPLICATION FILED SEPT. 15, 1905.

WITNESSES

INVENTOR
Joseph J. Englert,
BY Milo B. Stevens & Co.
Attorneys

No. 844,998. PATENTED FEB. 19, 1907.
J. J. ENGLERT.
TAG WIRING MACHINE.
APPLICATION FILED SEPT. 15, 1905.

INVENTOR
Joseph J. Englert,
By Milo B. Stevens & Co.
Attorneys.

WITNESSES:

No. 844,998. PATENTED FEB. 19, 1907.
J. J. ENGLERT.
TAG WIRING MACHINE.
APPLICATION FILED SEPT. 15, 1905.

WITNESSES:
INVENTOR
Joseph J. Englert,
BY Milo B. Stevens & Co.
Attorneys.

No. 844,998. PATENTED FEB. 19, 1907.
J. J. ENGLERT.
TAG WIRING MACHINE.
APPLICATION FILED SEPT. 15, 1905.

WITNESSES:

INVENTOR
Joseph J. Englert,
BY Milo B. Stevens & Co.
Attorneys

UNITED STATES PATENT OFFICE.

JOSEPH J. ENGLERT, OF CHICAGO, ILLINOIS.

TAG-WIRING MACHINE.

No. 844,998.      Specification of Letters Patent.      Patented Feb. 19, 1907.

Application filed September 15, 1905. Serial No. 278,662.

*To all whom it may concern:*

Be it known that I, JOSEPH J. ENGLERT, a citizen of the United States, residing at Chicago, in the county of Cook and State of Illinois, have invented new and useful Improvements in Tag-Wiring Machines, of which the following is a specification.

This invention is a machine for wiring tags. Among the principal features are means for feeding the tags, devices for inserting the wire in the tags, twisting the wire and cutting or separating the wired tags from the feed-wire or wire-chucks, and means for ejecting or delivering the wired tags. Novel features will also be found in the details of construction, such as the means in the feeding device for separating the tags so as to feed one tag at a time, the wire-cutter on the lower wire-chuck, the means for turning the tag-holder while twisting the wire, and the adjustable fingers or guides between which the wire passes while the wire is being twisted.

The main features of its construction are as follows: Mounted on the table or top of the machine is a feeding device which is operated by two eccentrics, one for moving a slide or tag-carrier, which takes a tag at each forward movement, and the other for working a device which separates and places but one tag at a time on the carrier. The carrier referred to shoves the tag into position for wiring. Two vertically-reciprocating wire-chucks are employed. One works below the tag and inserts the wire through the hole therein. The upper chuck then grasps it and receding pulls a sufficient length of wire through the tag, the lower chuck also receding from its position. The wire then extends vertically through the hole in the tag. The chucks next approach each other, and a tag-holder grasps the tag and pulls it away from its position between the chucks. The tag-holder while pulling the tag backward at the same time very rapidly turns the tag, so as to twist the wire, (say two to three times.) This rotation of the tag-holder is accomplished by a rack and pinion and spring device, and while the tag is being pulled backward and the wire twisted two adjustable fingers regulate the tension of the wire. When the wire is twisted, the lower chuck cuts off its end of the wire and the upper chuck releases its end of same. The tag is then taken by the ejector and discharged from the machine.

In the accompanying drawings, Fig. 4 is an end view taken in direction of arrow 4 in Fig. 2. Fig. 10 is a section on the line 10 10 of Fig. 3 and showing an elevation of the ejecting device. Figs. 17 and 18 are elevations illustrating two positions in the wiring action.

*The main frame and driving parts.*—10 indicates the main frame, which is of metal and consists of a table $10^a$, having suitable apertures for several of the parts to operate through. Supporting this table are vertical parts or legs $10^b$. $10^c$ are longitudinal pieces, and $10^d$ are cross-braces. Near one end of the frame and extending through the table $10^a$ is a vertical standard 11, secured to the frame and extending above and below the table $10^a$. This standard supports rods or guides on which the wire-chucks reciprocate vertically. The standard 11 consists specifically of a vertical part $11^a$, having an upper and a lower extension or arm $11^b$ and $11^c$, respectively, and mounted on these arms are two vertical guide-rods 12 and 12$^a$, and these guides carry two sliding cross-heads or chuck-supports 12$^b$ and 12$^c$, to which the chucks 35 and 36, respectively, are attached.

The main drive-shaft 13 is mounted in bearings on suitable brackets or parts of the frame. At the rear end this shaft has a suitable drive-pulley, to which power may be applied. In actuating several of the devices in the machine I preferably employ eccentrics, although the wire-chucks are reciprocated by oppositely-acting cranks.

Five eccentrics 14, 15, 16, 17, and 18 are employed on the main shaft 13. The eccentric 14 is for moving a slide which feeds each tag forward into a position between the wire-chucks. The eccentric 15 is for actuating a device which allows but one tag at a time to be moved by the feed-slide. The eccentric 16 is for operating a releasing device which causes a spring to actuate a rack which rotates a pinion provided with a rod having fingers which revolves the tag and twists the wire. 17 is an eccentric having means for reciprocating a clamp which grasps the tag after the wire has been pulled through same. 18 is an eccentric for operating the ejecting device after the wire is cut. 19 and 20 are cranks on the main shaft for actuating the wire-chucks.

*The feeding device.*—The tag-feeding device employed in this machine (see Figs. 2, 3, 4, 8, 9, 19, 20, 21) is constructed as follows: 23 is a small table attached to the top of the main frame and projecting outwardly and forwardly from same. The top 23$^a$ of this table has a grooved way 23$^b$, in which slides a reciprocating feed-plate or carrier 24. This plate is actuated by suitable connections to the eccentric 14 on the main shaft 13. The connections are as follows: On the bottom of the plate 24 are lugs 24$^a$, to which is attached a connecting-rod 24$^b$ to a lever 24$^c$, projecting from a sleeve 24$^d$, Fig. 2, mounted on a suitable bearing in a bracket 24$^e$. 24$^f$ is a slotted crank-arm attached to the sleeve 24$^d$. Between the crank 24$^f$ and the eccentric 14 is an adjustable connecting-rod 14$^a$. The slotted crank 24$^f$ permits the stroke or reciprocating distance of the plate 24 to be regulated, while the set of the eccentric 14 on the shaft allows the movement of the plate 24 to be regulated to accord with the movements of parts of the other devices.

Mounted on the table-top 23$^a$ are four vertical corner-pieces or guideways 25$^a$, 25$^a$ and 25$^b$ 25$^b$. These guideways form a magazine or chute 25, into which the unwired tags are placed. The guideways 25$^a$ are mounted adjustably on a rod 25$^c$, attached to brackets 25$^d$. The guideways 25$^b$ are also adjustable by means of a clamp 25$^e$, Figs. 4, 8, which secures a foot of each of the guideways to the table-top 23$^a$. Thus the chute may be made to adapt itself to various-sized tags.

26 is a vertical rod or post attached near its lower end to the rod 25$^c$. This post serves as a guide upon which a weight 26$^a$ slides, the said weight resting on the tags. This post also serves as a guide for the ends of tags having their corners cut away. The lower end of the post consists of a thin metal strip 26$^b$, Fig. 9, so as to permit the pivoted feed-blades to pass same.

27 and 28 are separating-blades pivoted to the table-top 23$^a$ of the machine. Normally these blades stay in the position shown in Fig. 3 and are intended for the purpose of separating the lowest tag, so that only one tag at a time can be taken forward by the carrier or plate 24.

Figures 1, 2, 6, 7:
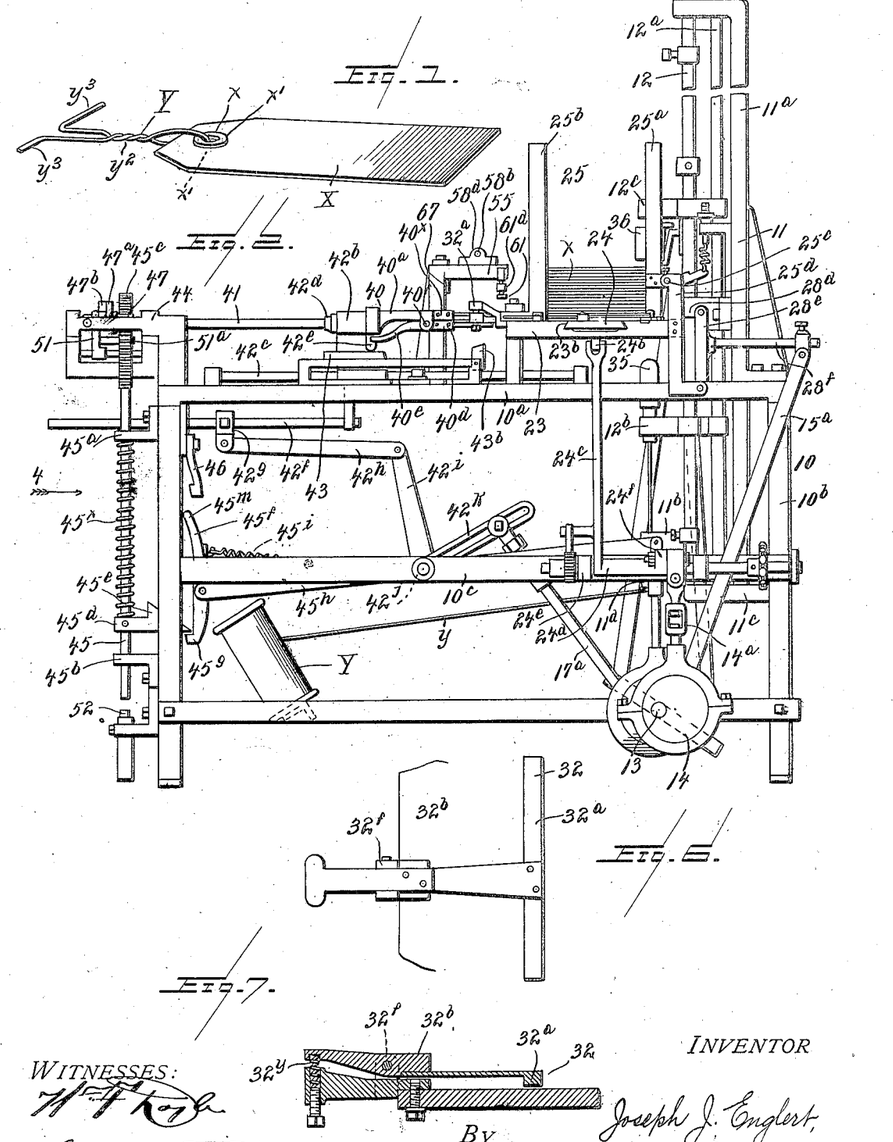
Figure 1 is a perspective view of one of the tags wired, showing the work done by the machine.
Fig. 2 is a front view of the machine.
Figs. 6 and 7 are details in plan and section of a presser device forming a part of the feeding devices.
Figures 2, 3:
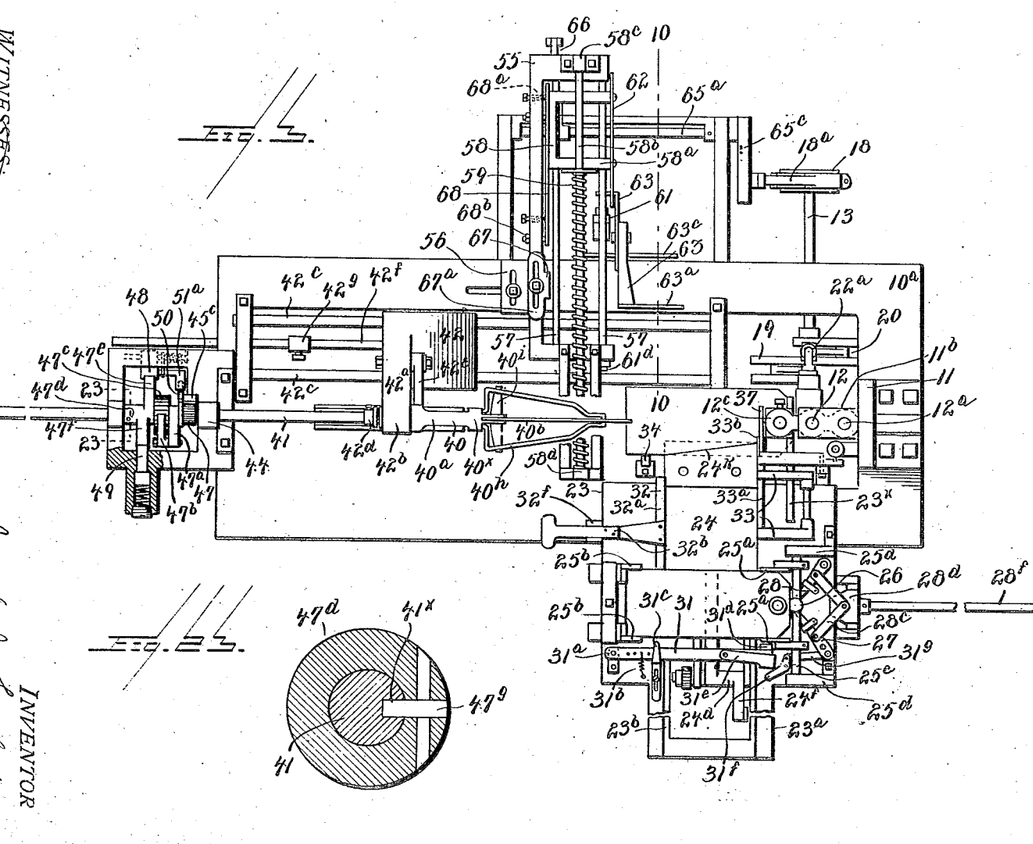
Fig. 3 is a top plan view of same.
Figure 2:
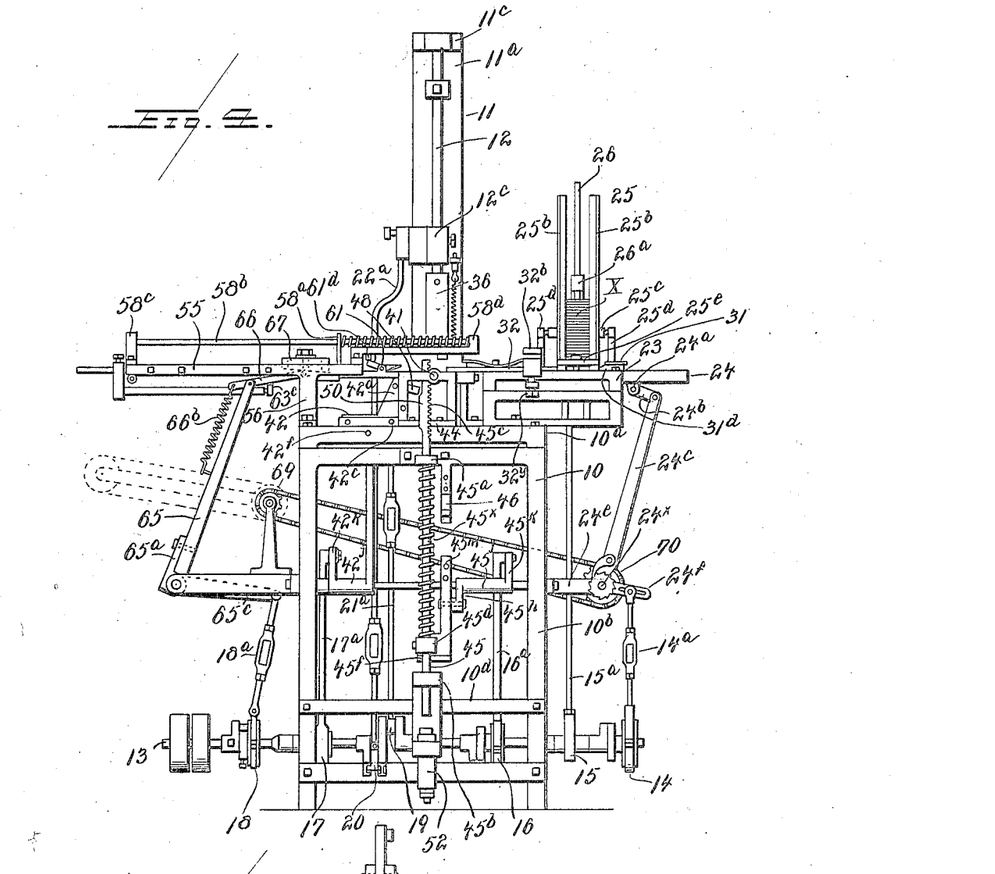
Figure 8:
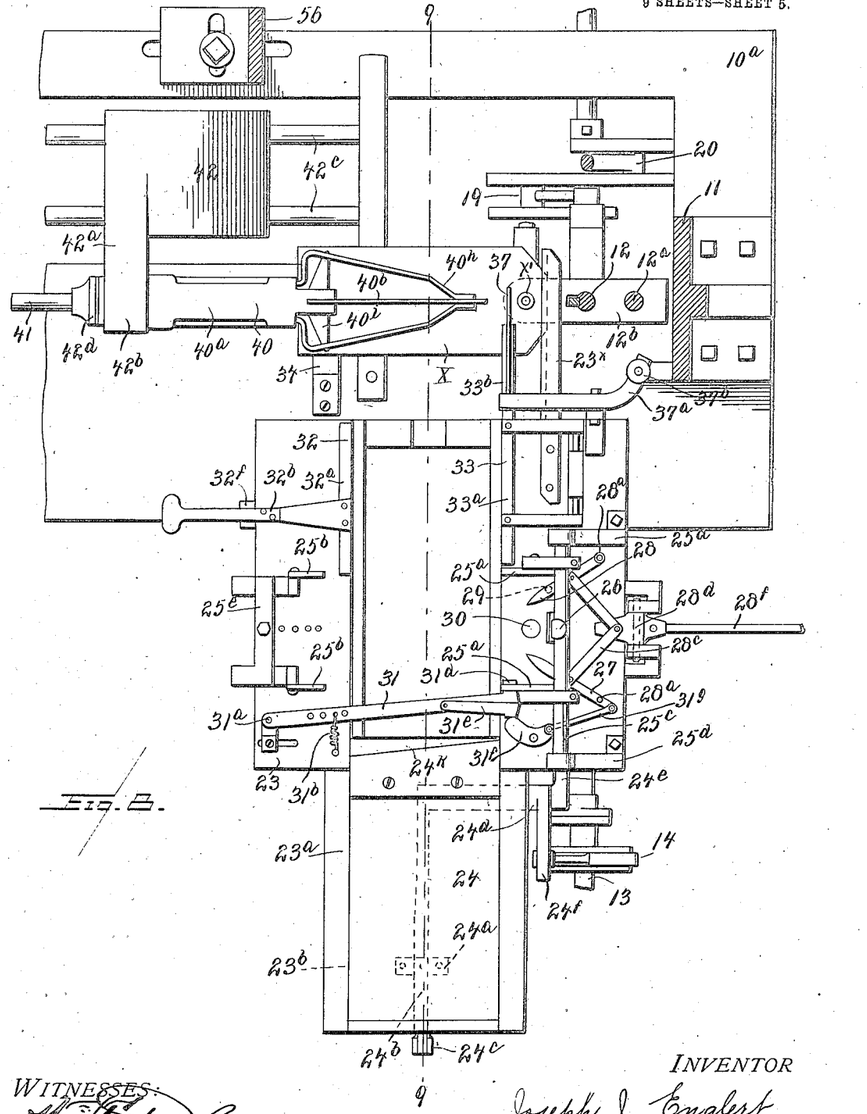
Fig. 8 is a plan view principally showing the tag-feeding devices, the parts being in position where the bottom tag in the magazine has been separated to be engaged by the carrier which is ready to move forward and carry the tag to the wiring devices.

Referring to the tag which is indicated by X, Fig. 1, $x$ is an eyelet in same, $x'$ $x'$ are reinforcements to strengthen the eyelet, and Y is the wire inserted and twisted. These reinforcements $x'$ cause the tags when piled up before they are wired to have a slight space between each other, so that when the blades or fingers are actuated so as to assume their forward position, as shown in Fig. 8, the said blades insert their points between the lowest tag and the remaining ones above. These blades also tend to hold the bottom tag in a proper or even position so as to be readily engaged by the carrier 24 in its forward movement. The second blade 28 is engaged by a small stud 29, Fig. 21, as it reaches the end of its movement, and this causes the blade to rise slightly so as to prevent the next or second tag from following the bottom tag when it passes through the openings at the bottom of the guideways or from getting stuck in same.

Figures 9, 19:
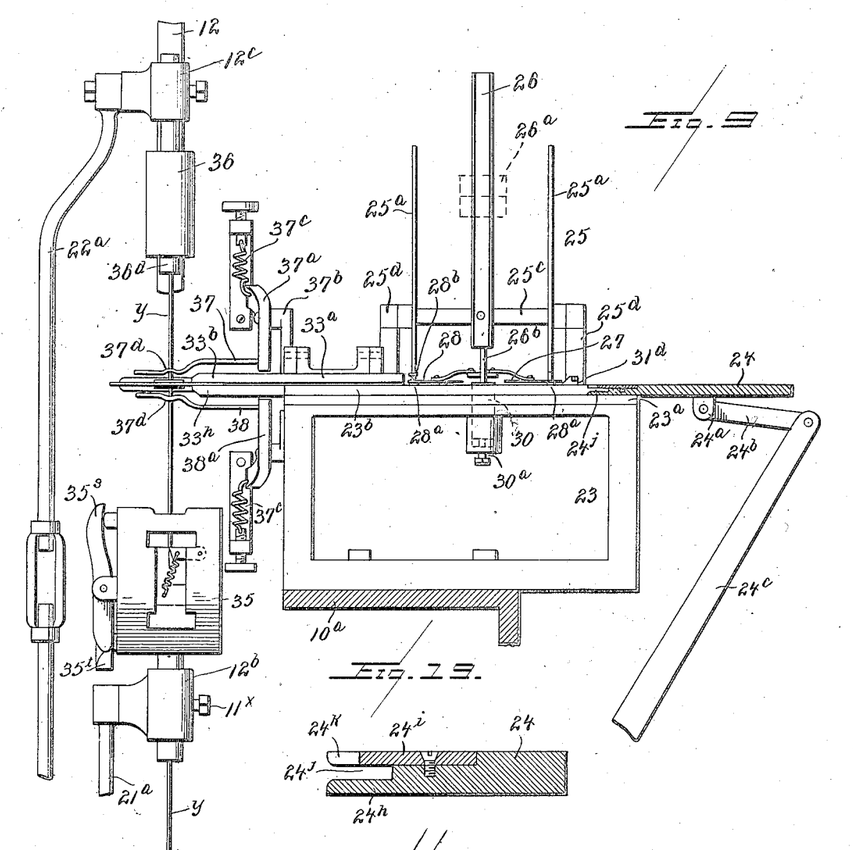
Fig. 9 is a sectional detail and elevation on line 9 9 of Fig. 8.
Fig. 19 is a detail in section of the front end of the tag feeder or carrier.

The blades 27 and 28 are each pivoted at 28$^a$, Figs. 8, 9, at one side of the table. The blade 28 has a small spring 28$^b$, which causes the blade to resume a slightly lower position after it returns off the stud 29. 28$^c$ are connecting-bars attached to the blades and to a head 28$^d$, mounted on a tilting bracket and lever device 28$^e$, and this is provided with an arm 28$^f$, from which a connecting-rod 15$^a$ is attached to the eccentric 15 on main shaft. The movement of this eccentric swings the lever 28$^e$ and operates the blades 27 28.

Figures 5, 21, 22:
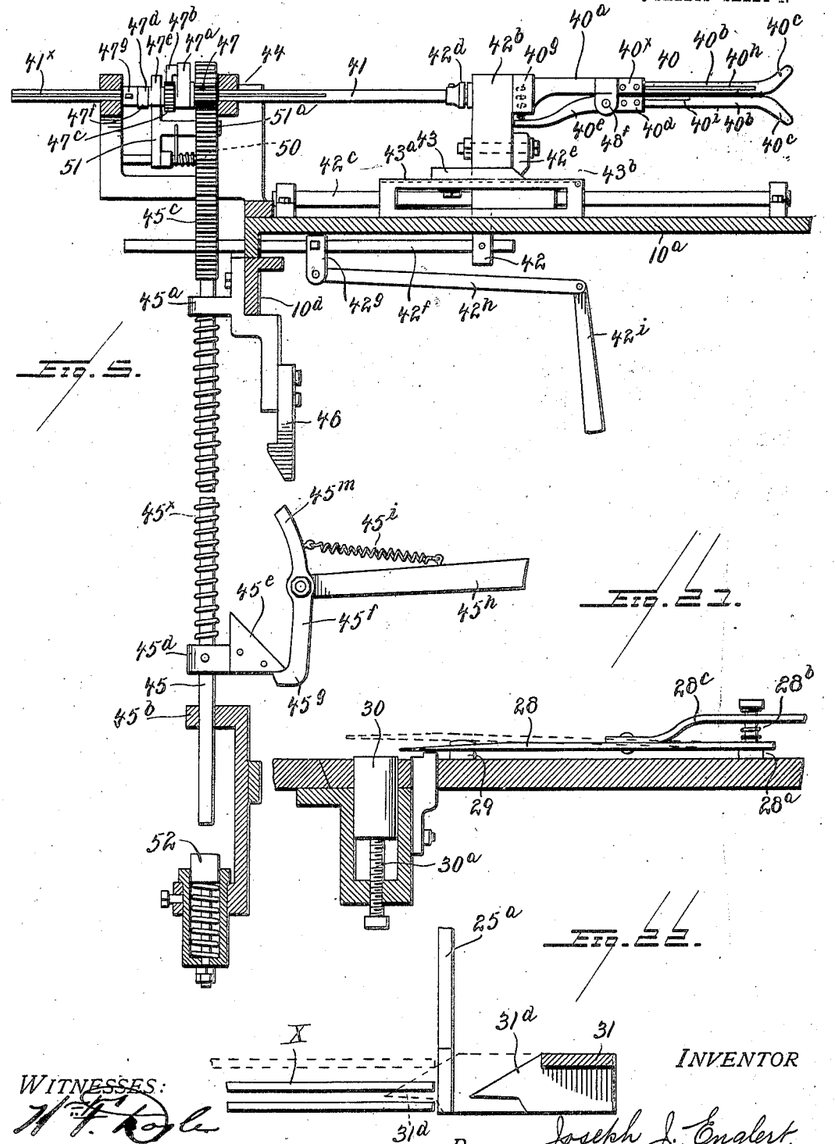
Fig. 5 is a sectional detail showing the tag-holder and the wire-twisting device.
Fig. 21 is a detail in section of the same and associated parts.
Fig. 22 is a detail showing further means for separating the lowest tag from those above.

30, Figs. 8 and 21, is an adjustable block projecting slightly above the table and upon which the reinforced ends of the tags rest. This resting-block is to place the tags in a proper position to be engaged by the separating or feeding blades 27 28. This adjustable block has a set-screw 30$^a$ beneath the table.

31 is a bar pivoted at 31$^a$ to the table. 31$^b$ is a spring to keep the bar in a retracted position. 31$^c$ is a stop. The front end of this bar has a beveled block or wedge 31$^d$, Fig. 22. 31$^e$ is an adjusting member for regulating the movement of the bar 31. It is fastened to the bar by a screw at one end, and by loosening the screw it can be turned in or out a little to vary the stroke of the bar.

$31^f$ is a bell-crank or lever, and $31^g$ is a connecting-bar from same to the movable blade 28. The movement of this blade causes the bar 31 to move forward by the lever $31^f$ striking the member $31^e$, and the wedge then enters and raises the upper tags above the bottom one at one side, so as to further enable the forward lips of the carrier or plate 24 to engage the bottom tag. The lower side of the block $31^d$ also presses on the lowest tag, so as to hold it while the said lips of the carrier engage the tag. The movement of this bar into said position, as shown in Fig. 8, occurs before the carrier enters under the tag-chute.

The carrier or feed-plate 24 (see Fig. 19) has a transverse groove or recess $24^j$ on the forward end of said plate, so as to provide two lips or flanges $24^h$ and $24^i$, which engage the side edge of the tag X and carry it to the wiring device, which automatically inserts the wire through the eyelet in the tag. A particular and especial feature of these flanges is that the lower one, $24^h$, which is preferably rounded on its edge, is square or at right angles to the sides of the plate 24, while the upper flange $24^i$ is diagonal thereto or beveled, as at $24^k$. These two flanges provide the groove $24^j$, which engages the tag. The upper flange may consist of a removable plate. The object of making the flange $24^i$ thus is that the said flange or lip works in gradually between the bottom tag and the upper one. Thus if the wedge $31^d$ opens but a small space between the two tags this diagonal or beveled flange will work its way in nicely, and so carry the tag along.

32 and 33, Figs. 3, 6, 7, and 8, refer to friction guides or pressers in front of the chute and are for keeping the tags uniformly in the proper direction or alinement before they reach the wiring-point. At one side of the table 23 is placed the presser 32, which consists of a longitudinal bar $32^a$, which is secured to a lateral arm $32^b$, pivoted on a bracket $32^i$, and is provided with a spring and set-screw $32^y$ for adjusting the pressure of the bar $32^a$. On the opposite side of the table is a pivoted arm 33, having a bar $33^a$, which bears down on one of the ends of a tag and acts in conjunction with the presser 32, which bears on the opposite end of the tag. These presser-bars provide a certain amount of friction and prevent the tags from twisting about or otherwise getting out of place while being fed to the wiring device. The bar $33^a$ extends at $33^b$ (see Fig. 9) in the form of a jaw beyond the table-top $23^a$ to near the wire-chucks. A pivotal bar $37^a$, provided with a spring $37^c$, keeps the bar $33^a$ down. The bar $37^a$ also carries the tension device 37.

Beneath the part $33^b$ is a similar jaw $33^h$, attached to the table 23 and pressed by bar $38^a$ and spring $38^c$. The jaws $33^b$ and $33^h$ form a pair of nippers which hold the tag while the wire is being inserted through same. When the carrier 24 reaches the forward end of its stroke, the tag is shoved over a stop or beveled part 34, Figs. 3, 8, which acts as a stripper and prevents the tag from following the carrier 24 when it recedes into a position to carry forward another tag. The stop 34 has an incline over which the tag rides on its advance, terminating in a shoulder, behind which the tag finally drops.

Attached at the end of the table-top $23^a$ is a grooved strip $23^x$, which engages and holds the wiring end of the tag while it is being fed between the wire-chucks.

The tag X after having been left by the carrier 24 and held by the stop 34 is now in a position to be wired. It will be understood, however, that this stop 34 is only intended to keep the tag from following the backward movement of the carrier and is a positive check to keep the tag from going back; but it does not hold the tag horizontally while the wiring device operates. This is accomplished, however, by the nippers $33^b$ and $33^h$ and the grooved bar $23^x$.

*The wiring and twisting devices; general operation.* (See the general figures and detail Figs. 9, 12, 13, 14, 15, 16, 17, and 18.)— The general operation of these devices is as follows: 35 is the lower wire-chuck. This is mounted to reciprocate vertically and carries the wire, pulling it from a suitable spool or holder, and is intended to feed the wire and direct it from below through the eyelet in the tag. The wire is fed vertically by the lower chuck 35, and after passing through the eyelet it is then caught by the upper chuck 36, which pulls the wire up a suitable distance. These chucks will be described fully hereafter. As now described we have the wire passed up through the eyelet in the tag and caught by the upper chuck 36. In this position the wire through the eyelet is vertical. However, at this time the grippers or fingers of the tag-holder and wire-twister 40 have advanced and caught hold of the tag. The wire-chucks then approach each other, thus giving an amount of slack, and the tag-holder 40 then withdraws the tag from the wire-chucks, which operation takes up the slack, and as this tag-holder moves backward it is rotated several times, thus twisting the wire. The tag having been pulled away a certain distance from the chucks 35 and 36, an amount of back wire $y^3$ is left beyond the twisted part $y^2$, and by reason of the wire passing against the two fingers 37 and 38 on the bars $37^a$ and $38^a$, respectively, parts of wire are left extending laterally from near the twisted part, as shown in Fig. 1. Having reached this position, the lower chuck 35, which has a cutter, cuts off its end of the wire, while the upper chuck 36 releases its engagement with the upper end of the wire. The tag is thus wired, and the tag-holder 40 then releases its hold and an ejector engages the tag, which is quickly ejected and deposited on an endless apron to be carried to any suitable point.

*The wiring devices.*—The wire $y$ having been wound on a spool Y, the said spool is placed on a spindle in the lower part of the machine. From the spool Y the wire $y$ is taken to and passes through a centering piece or nipple $11^d$ on the bracket $11^b$ and from there to the lower wire-chuck 35. The wire-chuck 35 is attached by a set-screw $11^x$ to the sliding cross-head $12^b$, which is mounted on the rods 12 and $12^a$.

Extending from the cross-head $12^b$ and adapted for reciprocating the same is a connecting-rod $21^a$, (preferably adjustable with a turnbuckle,) attached to crank 19 on main shaft 13, which reciprocates the chuck. On the rod 12 are two cams $35^a$ and $35^b$, Figs. 17 and 18, for operating parts of the chuck 35 during the up and down movement thereof.

$35^c$, Figs. 14 to 18, is the chuck-head. This has a hollow shank $35^d$, through which the wire passes, and this shank $35^d$ is held in the cross-head $12^b$ by a set-screw $11^x$. The chuck-head $35^c$ has a central recess $35^e$, in which there is a vertical grooved way $35^f$, having a face-plate $35^g$. Sliding vertically in the way $35^f$ is a wire grip block or clutch $35^h$. This has a jaw $35^i$ with a spring for normally engaging the wire, but permitting the clutch to slip backward on the wire. $35^j$ is a small lateral lever or pivoted arm mounted on the side of the chuck-head. This operates a connecting-rod $35^k$, attached to the grip block or clutch $35^h$. A spring $35^l$ keeps the grip-block in a downward position. When the chuck 35 is moved upward, the cam $35^a$ engages the lateral arm or lever $35^j$ (see Figs. 17 and 18) when the chuck approaches the tag. This causes the grip-block to engage the wire and move it upward so as to project beyond the chuck, so that when the chuck reaches the tag the wire will pass through the eyelet in the tag and extend above the same. The upper chuck 36 there engages the piece of wire projecting through the eyelet and pulls it up farther, as heretofore stated.

At the top of the chuck 35 is a cross-rod $35^m$, having a small vertical hole $35^n$, through which the wire $y$ passes. Sliding on the rod $35^m$ is a sleeve $35^o$, provided with a cutting edge or cutter $35^p$. A spring $35^q$ normally keeps the cutter back from the wire. $35^s$ is a pivoted side lever. Engaging the lower end of the lever $35^s$ is a beveled or cam arm $35^t$. This arm is attached to a turning cross-rod $35^u$, which is mounted in suitable bearings and has a lateral arm $35^v$ and a spring $35^w$. When the wire has been fed through the eyelet of the tag and twisted, the chuck 35 has been traveling upward until the cam $35^b$ engages the arm $35^v$. This causes the said arm to operate the cutter $35^p$ and causes it to cut off the wire. The chuck is then ready for the next operation.

36 is the upper wire-chuck. This consists of a block or head $36^c$, having a fixed jaw $36^d$ and a movable jaw $36^e$, preferably having serrations $36^f$ and pivoted at $36^g$ to the head. Part of the jaw works in a slot $36^h$, and the said jaw has a lever or arm $36^i$ and a spring-presser $36^j$ for keeping the jaw in closed position. The arm $36^i$ has a laterally-projecting hinged spring-dog $36^k$. $36^l$ is a stop above the dog to limit its upward movement. The spring $36^m$ normally holds the dog up, but allows it to swing down. $36^b$ is a shank by which the head 36 is attached with a set-screw to the cross-head $12^c$, which is mounted on the vertical rods 12 and $12^a$. The vertical rod 12 has a cam $36^a$ on its side. From the cross-head $12^c$ a connecting-rod $22^a$, Fig. 4, is attached to the crank 20, and this operates the wire-chuck 36. The cam $36^a$ is preferably made adjustable and also in sections, so that a longer movement or shorter may be made before it grips the wire and disengages same. The cam $36^a$ is inserted in a slot $12^d$ in the rod 12 and secured by screws, and the cams $35^a$ and $35^b$ are similarly attached. While the wire-chuck 35 is moving up the wire-chuck 36 is moving down. Thus when the wire $y$ has been inserted through the eyelet in the tag the chuck 36 has approached same with its jaws open, being held so by the bottom part of cam $36^a$ pressing the dog $36^k$, which by its contact against the stop $36^l$ cannot swing upwardly, but yields and slides inwardly, carrying with it the arm $36^i$ and opening or moving the jaw $36^e$ away from the fixed jaw. On passing the lower end of cam $36^a$ the jaw $36^e$ immediately closes on the wire and grasps it. The chuck 36 then moves up, the chuck 35 going down; but as the dog $36^k$ is hinged it is not affected by the cam $36^a$ in the upward movement of the chuck 36. The chuck thus pulls the wire along and draws a sufficient length through the eyelet. The wire-chucks 35 and 36 having reached their lowest and highest positions, respectively, proceed to approach each other again, which gives slack wire, and the tag-holder 40 having grasped the tag starts to pull it away from the wiring-chucks and also rotates the tag and twists the wire, the two strands $y^3$ of the wire in the rear passing between the fingers 37 and 38. The lower chuck 35 now cuts its end of the wire, the arm $35^v$ engaging the cam $35^b$ and operating the cutter $35^p$, and the upper chuck 36 by the dog $36^k$ engaging the cam $36^a$ opens its jaws and disengages its end of wire. The chucks are now ready to wire the next tag.

*The wire-twisting devices.* (See Figs. 2, 3, 5, and 18.)—40 refers to the tag-holder as a whole. This consists of a head $40^a$, provided with a fixed jaw $40^x$, having a guide-finger $40^b$, which has its front end bent up, as at $40^c$. Below the finger $40^b$ is a movable jaw $40^d$, having a finger similar to the upper jaw. This jaw is carried by a lever $40^e$, which is pivoted at $40^f$ to the head $40^a$. A spring $40^g$ normally keeps the jaws closed.

$40^h$ are light wire wings or side pieces on the upper finger, and $40^i$ are wings on the lower finger. These wings support the sides of the tag while the same is being rotated. The head $40^a$ is mounted on a rod or shaft 41, which extends to the rear of the machine. This shaft has bearings in a collar or box $42^b$, forming part of a bracket $42^a$ on a sliding cross-head 42, and also in a bracket or small stand 44 at rear of machine. The cross-head 42 is mounted on two rods $42^c$, which are attached to fixed bars on the top of the main frame.

The head $40^a$ is attached to the end of the shaft 41 next the bearing $42^b$. On the other side of this bearing $42^b$ is a ball-bearing device $42^d$, which is provided with a sleeve and means for securing the same on the shaft 41.

At one side of the bracket $42^a$ is a finger or dog $42^e$, which is pivoted to same and extends under the lever $40^e$ and is for opening the jaws of same when the tag is to be released after the wire is twisted. The finger or dog $42^e$ is operated by a cam 43. This consists of an adjustable and suitably-shaped block fixed in a groove in a small frame $43^a$ beneath the head $40^a$ and its shaft. At the front of the frame $43^a$ is a pawl or pivot-cam $43^b$. This is also for operating the jaws of the tag-holder 40 to open same at the end of its forward movement to grasp the tag.

Attached to a lug on the bottom of cross-head 42 is a reciprocating rod $42^f$. This has a bearing in the frame of the machine. $42^g$ is an adjustable block on the rod $42^f$. Attached to this block and to a crank-arm $42^i$ is a connecting-rod $42^h$. The crank-arm $42^i$ (see Fig. 2) is attached to a sleeve $42^j$, mounted on a cross-rod in the frame of the machine. This sleeve $42^j$ has a slotted crank $42^k$, from which is adjustably attached a connecting-rod $17^a$ to the eccentric 17. The eccentric 17 reciprocates the tag-holder 40 by means of these connections. The tag-holder 40 is moved forward by said connections to the cross-head 42, and the parts are so set that the holder moves forward while the wire is being vertically inserted in the tag. As the fingers or guides on the jaws of the tag-holder have a tapered opening between them, they slip over the tag, and when the holder has reached the proper point the pawl $43^b$ opens the jaws $40^x$ and $40^d$, which grasp the tag as the holder begins its backward movement from the wire-chucks. The wire-twisting operation then begins. This is accomplished principally by a rack operating a pinion on the shaft of the tag-holder. To operate this rack quickly, a spring and a releasing device are provided, and another important feature is the automatic adjustable fingers 37 and 38, heretofore described, which cause the twists to be made near the tag and close together.

45 is a vertical rod having bearings in brackets $45^a$ and $45^b$, attached to the frame. This rod is provided at its upper end with a rack $45^c$. $45^d$ is a collar or block fixed to the rod 45. This collar is provided with a beveled catch or projection $45^e$. Between the collar $45^d$ and the bracket $45^a$ is a spring $45^x$, which is compressed when the collar $45^d$ is moved upward. This movement is accomplished by a pivoted dog $45^f$, the lower end of which has a shoulder $45^g$, which is beveled on its under side, while the upper end of the dog is provided with a trigger $45^m$. This dog $45^f$ is pivoted to an arm $45^h$ and has a spring $45^i$ for keeping the dog in a proper position for engaging the catch $45^e$ and a fixed finger or releasing device 46 at the upper part of the frame. The arm $45^h$ projects from a sleeve $45^j$, (see Fig. 2,) which is mounted on a suitable bearing and has a crank $45^k$, provided with a connecting-rod $16^a$, to the eccentric 16. This eccentric operates the spring device for actuating the rack $45^c$.

Figure 23:
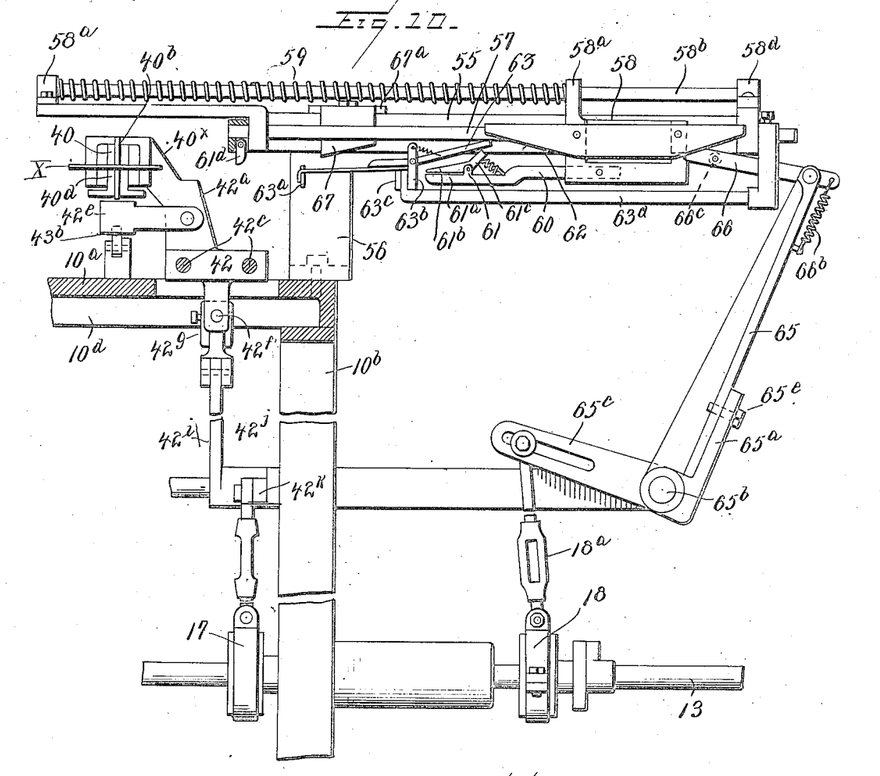
Fig. 23 is a detail in section on the line 23 23 of Fig. 3.
Figure 24:
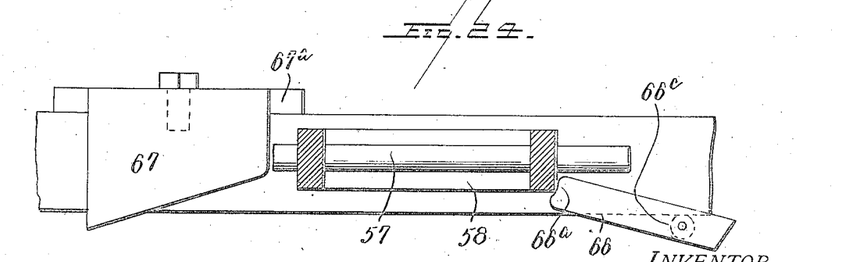
Fig. 24 is a detail of a releasing device in the ejecting mechanism.
Figures 25, 26:
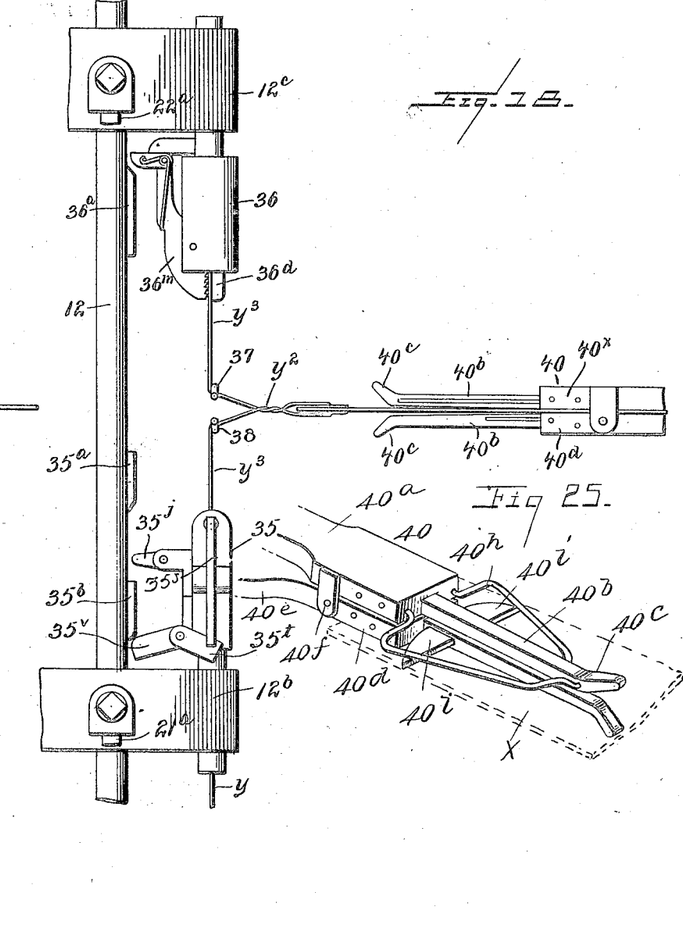
Fig. 25 is a detail in perspective of the tag-holder.
Figure 27:
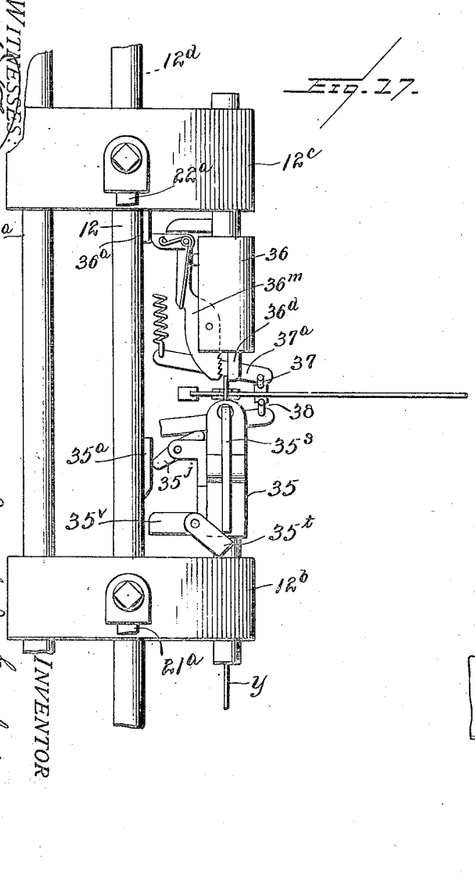

The rack $45^c$ engages a pinion 47, mounted on the shaft 41. This pinion is provided with an arm $47^a$, having a pawl $47^b$ in operative engagement with a ratchet-wheel $47^c$, which has a collar $47^d$, provided with two fingers or dogs $47^e$ and $47^f$, both of which have rounded ends to admit of them turning in certain directions past catches 48 and 49. Part of the collar $47^d$ has a tongue $47^g$, which engages a groove $41^x$ in the shaft 41. (See Figs. 3, 5, and 23.)

The back of the rack $45^c$ has a cam 50. 48 is a catch on an arm 51, mounted on a rod provided with a spring for keeping the catch in a forward position. This catch has a finger $51^a$, extending back of the rack $45^c$. The cam 50 on the back of the rack $45^c$ engages the finger $51^a$ during portion of the upward movement of rack and keeps the catch 48 out of engagement with the dog $47^e$ while the rack is being shoved upward. The catch 49, which is provided with a spring, is intended to engage the dog $47^f$ and prevent a back action of the other dog $47^e$ while the same is being engaged by the catch 48. 52 is a spring-buffer on the bottom of the bracket $45^b$. This receives the impact of the rod 45 when released from the dog $45^f$.

During the operation of moving the tag-holder 40 forward and grasping the tag the rack $45^c$ is moved upward by means of the dog $45^f$ engaging the catch $45^e$ on the collar 45$^d$, and the spring 45$^x$ is compressed. When the trigger 45$^m$ reaches the finger 46, the dog 45$^f$ is released from the catch 45$^e$ and the spring operates the rod 45, causing the rack 45$^c$ to revolve the pinion 47, which rotates the rod 41 and tag-holder 40, and so twists the wire. This is done while the tag-holder 40 is pulling the tag away from the wire-chucks. During this twisting action of the wire an important feature is the action of the two adjustable fingers or guides 37 and 38. These are slightly in front of the wire-chucks, the finger 37 being below and the finger 38 above the tag. The finger 37 is attached laterally to a pivoted arm 37$^a$ on a bracket 37$^b$, attached to the table 23$^a$. An adjusting-spring 37$^c$, having a nut and connecting-rod, is provided. The finger 38 is similarly mounted. (See Fig. 9.) These fingers preferably have each a corrugation 37$^d$ for keeping the wire in alinement while the tag is being pulled back.

The tag-holder 40 in pulling the tag away from the chucks has a movement or speed somewhat in excess of that with which the chucks move, and on account of the fingers being mounted on spring-arms they give or spread from their closer position, (see Fig. 18,) which causes the wire to be twisted close to the tag—that is, between the fingers and the tag—and also leaves the ends of the wire separated or projecting laterally from the twisted part. The lower chuck then cuts off its end, and the upper chuck releases its end, as already described. The tag is then taken by the ejecting device.

*Tag-ejecting device.* (See Figs. 3, 4, and 10, and 24.—This consists principally of a sliding tag-clamp which engages the tag just as it is released from the tag-holder 40, and when this tag-clamp recedes to the rear of the machine a stripping device removes the tag from the clamp, depositing the tag on an endless apron or at any other suitable point.

55 is a horizontal frame attached by a bracket 56 to the rear of the top of the machine. This frame lies at right angles to the main frame of the machine. It has two guide-rods 57, upon which is mounted a U-shaped cross-head 58, which is provided with a boss or collar 58$^a$, which slides on rod 58$^b$, centrally mounted in the frame on brackets 58$^c$ and 58$^d$. Between the collar 58$^a$ and the bracket 58$^d$ is a spring 59. (See Fig. 10.)

Attached to and beneath the cross-head 58 is a bar 60, having a clamp 61 provided with a stationary lower jaw 61$^a$ and a spring-jaw 61$^b$. The spring-jaw has an upper extension or arm 61$^c$. At the front of the frame, preferably attached to one of the rods 57, is a pivoted dog 61$^d$, which engages the arm 61$^c$ of the spring-jaw 61$^b$ and causes same to open when the cross-head has carried the clamp 61 to that point. In this position it engages the wired tag just when the same is released from the tag-holder 40. At this moment a connecting-lever 66, which advances the cross-head in a way hereinafter described, is released or tripped from the cross-head 28 by means of a cam 67. The spring 59, which was compressed by the advance of the cross-head, then comes into action and quickly returns the cross-head, carrying the tag to a stripper 63$^c$. The cross-head is provided with a cam 62 on its side, which engages a pivoted lever 63, provided at its inner end with a lateral finger or side piece 63$^a$. (See Figs. 10, 3.) This lever 63 is pivoted to a bracket 63$^b$, attached to a supporting-rod 63$^d$ under the frame 55. The bracket 63$^b$ has a stationary finger or stripper 63$^c$ projecting laterally into the path of the tag as it is withdrawn by the jaws 61. When the cross-head recedes with the tag, the lever 63 is tilted by the cam 62 on the cross-head. This raises the finger 63$^a$ and allows the tag to pass, after which the finger 63$^a$ immediately drops, and at the same time the finger or stripper 63$^c$ engages the end or portion of the tag which projects at the side of the jaws 61$^a$ 61$^b$ and strips the tag from the clamp 61, and it then drops onto an endless apron—for instance, as indicated at 69, Fig. 4—which may be driven by suitable means and extended as desired. The finger 63$^a$ drops behind the tag as it strikes the bar 63$^c$ and prevents it being knocked out too far and causes it to drop straight down upon the apron.

Figure 11:
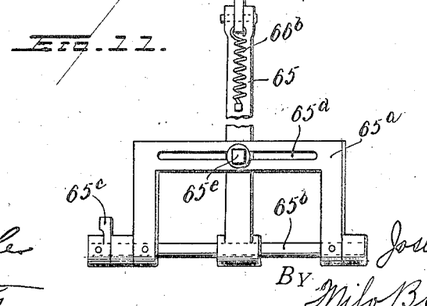
Fig. 11 is a detail of a lever and bracket connected with the ejecting mechanism.
Figures 12, 13, 14, 15, 16:
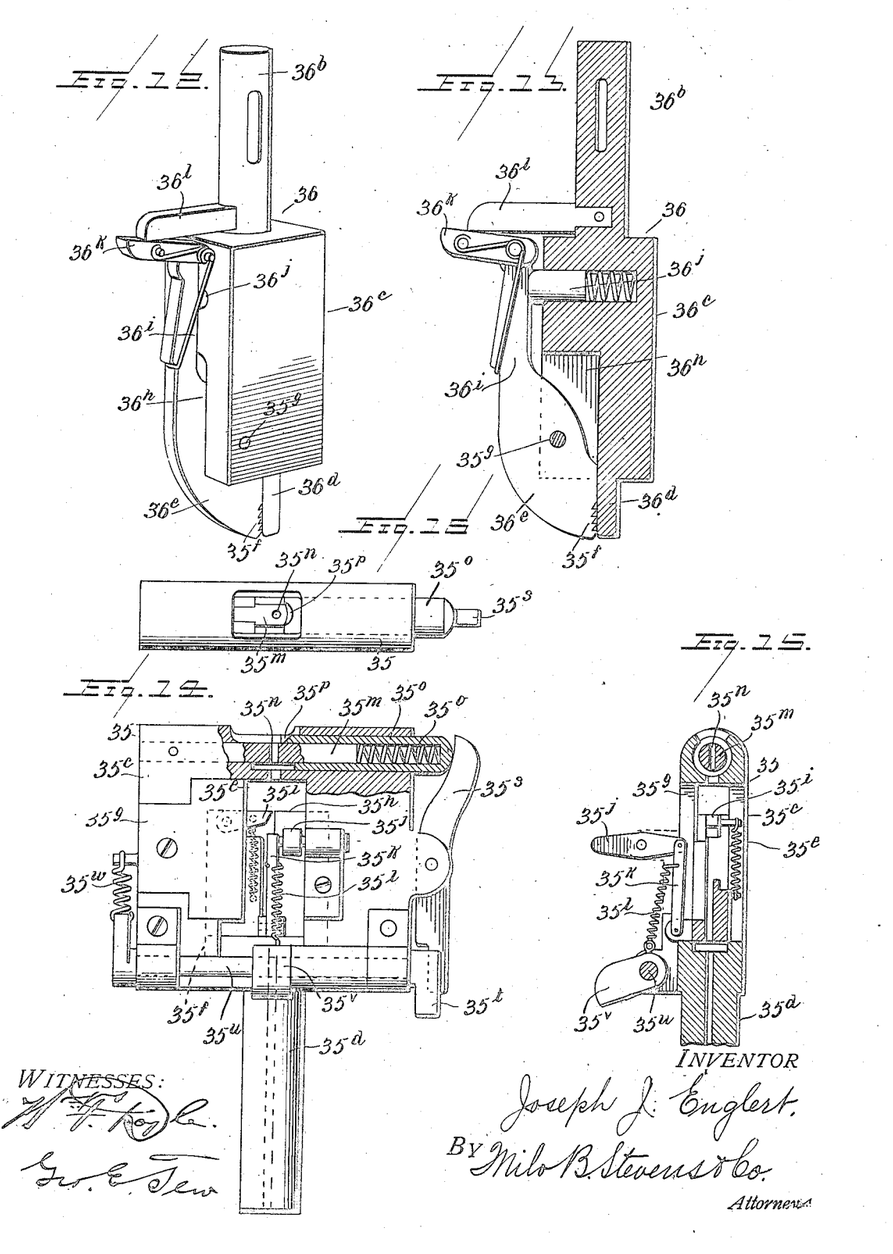
Fig. 12 is a perspective view of the upper chuck.
Fig. 13 is a vertical section of same.
Fig. 14 is a rear view of the lower chuck.
Fig. 15 is a vertical section of same.
Fig. 16 is a plan of same, showing the cutter.
Figure 20:
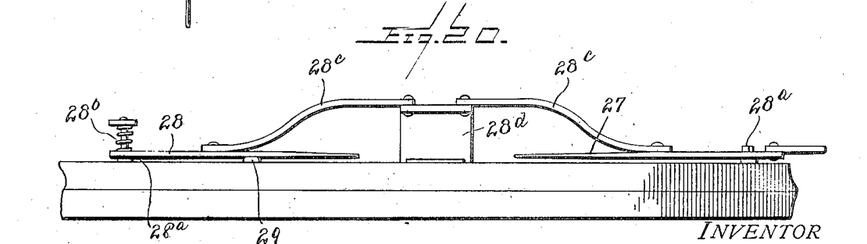
Fig. 20 is an enlarged detail of the blades for separating the lowest tag from those above it in the magazine.

To operate the cross-head 58, I provide a crank-arm 65, Figs. 10, 11, mounted on a shaft 65$^b$. The crank-arm 65 is reinforced by a bracket 65$^e$, which is also pivoted to the shaft 65. This bracket has a slot 65$^d$ and a set-screw 65$^e$, so as to adjust the arm 65 on the shaft 65$^b$. 65$^c$ is a crank attached to the shaft 65$^b$ and having a connecting-rod 18$^a$ to the eccentric 18. This eccentric reciprocates the cross-head 58.

At the top of the crank-arm 65 is a connecting-lever 66, having a slight notch 66$^a$, which engages by contact the rear of the cross-head 58. 66$^b$ is a spring for keeping the front part of the lever 66 in a raised position. 66$^c$ is a roller near the forward end of the lever 66, which rolls along the lower edge of the frame 55 (see Fig. 10) and holds the notched end of the lever in line with the cross-head. 67$^a$ is an adjustable bracket provided with a cam 67. The cam engages the roller 66$^c$ on the lever 66 at the end of its outward stroke and releases or trips the same from the cross-head 58 by depressing the same when the cross-head has reached the proper forward position, at which moment the clamp 61 has gripped the tag, and the spring 59 then causes the cross-head 58 to slide back, (see Fig. 24,) carrying with it the tag, which is dislodged from the clamp and dropped upon the apron, as above described.

At one side of the frame 55 is a flat presser 68. This bears frictionally against one side of the cross-head 58 toward the end of its rear movement and is intended to take up the impact of the back movement. This presser consists of a plate 68, provided with spring-adjusters 68ª and check-screws 68ᵇ behind it.

It is not essential that an endless apron should be employed to receive the tags, nor that the means shown for delivering the tags be employed. While it is the preferable construction, other means may be used. When an apron is used—for instance, at 69, Fig. 4—it may be driven by a chain from a sprocket-wheel 70 on any suitable shaft—for instance, on 24ˣ, which is driven by a ratchet-wheel and a pawl on the lever 24ᶜ.

The invention is not limited to the exact construction or arrangements of parts herein described and shown, but includes any equivalent or other mechanism within the scope of the following claims.

While I have described the chuck 35 as feeding vertically from below and the wire caught by the upper chuck 36, it is obvious that the position of these chucks may be reversed. Thus the chuck 35 may be placed above, having suitable connections for the wire, and the chuck 36 placed below, the operations of wiring being similar in every respect.

What I claim as new, and desire to secure by Letters Patent, is—

1. In a tag-wiring machine, in combination, mechanism to insert a piece of wire through a tag, a tag-holder movable to and from the said mechanism and arranged to withdraw the tag therefrom, means to operate the holder, and means to remove the tag from the holder.

2. In a tag-wiring machine, in combination, mechanism to insert wires through successive tags, means to withdraw the tags successively from said mechanism and to twist the wires thereof, means to feed tags successively to said mechanism, and means to eject the tags from said twisting means.

3. In a tag-wiring machine, in combination, mechanism to insert wires through successive tags, a holder slidable to and from mechanism and adapted to grip and withdraw the tags therefrom, a tag-carrier working laterally with respect to the line of movement of said holder and arranged to feed tags sidewise to said mechanism, means to operate the holder, and means to remove tags from the holder.

4. In a tag-wiring machine, the combination of a wire-inserting mechanism, of a magazine for tags, a reciprocating tag-carrier working back and forth from the bottom of the magazine to the said mechanism, and guides from the magazine to the said mechanism, one of said guides having a groove into which the eyelet end of the tag enters and is held during the insertion of the wire.

5. In a tag-wiring machine, a wire-inserting mechanism comprising upper and lower reciprocating chucks, one of which has jaws arranged to grip and feed the wire through the tag and a cutter to cut the wire when so fed, and the other of which has jaws arranged to grip the end of the wire and draw the same through the tag.

6. A wire-feeding chuck and cutter comprising a reciprocating head, jaws therein arranged to grip and feed the wire, a trip-lever operatively connected to one of the jaws, a cutter in the head, arranged to cut the wire beyond the jaws, and a trip-lever operatively connected to the cutter.

7. A wire-feeding chuck and cutter comprising a reciprocating head, jaws therein arranged to grip and feed the wire, a sliding cutter in the head beyond the jaws, arranged to work across the wire-passage, a trip-lever operatively connected to the cutter, and means actuated by the reciprocation of the head to operate the jaws and the cutter.

8. In a tag-wiring machine, a wire-inserting mechanism comprising a pair of reciprocating chucks which work to and from each other, each chuck having jaws to grip the wire, and one having a cutter to cut the wire, and means to operate the jaws and the cutter.

9. In a tag-wiring machine, in combination, reciprocating chucks movable to and from a tag held therebetween, means to so hold a tag, said chucks having jaws adapted to grip a wire and insert the same through the tag, fingers arranged beside the wire on opposite sides of the tag, a rotary holder movable back and forth and having means to grip a tag so held and to withdraw the same laterally from the chucks, and draw the wire across the fingers, with rotation to twist the wire between the tag and the fingers, and means to operate the holder.

10. In a tag-wiring machine, the combination with means to hold a tag, and means to insert a wire therethrough and to slack the wire on both sides of the tag, of a rotary holder movable back and forth and having means to grip and withdraw the tag, with rotation to twist the wire, and means to operate the holder.

11. In a tag-wiring machine, the combination with a tag-support, and means to insert a wire through the tag and to hold both ends of the wire, of a pair of yielding fingers supported on opposite sides of the tag, beside the wire, and a rotary holder movable back and forth and having means to grip a tag on the support and to withdraw the same therefrom and draw the wire across the fingers, with rotation to twist the wire between the tag and the fingers, and means to operate the holder.

12. In a tag-wiring machine, the combination with means to insert a wire through a tag, of means to rotate the tag to twist the wire, including a rotary holder having jaws and converging guides thereto, and wings extending from the jaws, to support the edges of the tag during rotation, and means to rotate the holder.

13. A twister for a tag-wiring machine, comprising a reciprocating carriage, a rotary holder mounted on the carriage and having a pair of jaws at the front, constructed to close and open to grip and release a tag, and means to rotate the holder.

14. In a tag-wiring machine, a twister mechanism comprising a carriage, means to reciprocate the same, a shaft on the carriage having jaws at the front end, means to close and open the jaws to grasp and to release a tag, and means to rotate the shaft on the backward motion, after the jaws grasp and before they release the tag.

15. In a tag-wiring machine, a twister mechanism comprising a carriage, means to reciprocate the same, a shaft on the carriage having means at the front end to grasp and to release a tag, and means to rotate the shaft after the tag is grasped and before it is released.

16. In a tag-wiring machine, a twister mechanism comprising a carriage, means to reciprocate the same, a shaft on the carriage having means at the front end to grasp and to release a tag, a pinion on the shaft having means to engage the same when turned in one direction, a rack engaging the pinion, and means to reciprocate the rack.

17. In a tag-wiring machine, the combination with a shaft having a tag-holder at the front end, a pinion on the shaft having means to engage the same when turned in one direction, a reciprocating rack engaged with the pinion, means to slide the rack in one direction, a tripper to release said means, and a spring connected to the rack and arranged to slide the same in the other direction, when so released.

18. In a tag-wiring machine, a twister mechanism comprising a carriage, means to reciprocate the same, a shaft on the carriage, means to intermittently rotate the same, a pair of tag-holding jaws at the front end of the shaft, and means including cams arranged to be struck by one of the jaws, to open the same at predetermined points.

19. In a tag-wiring machine, in combination, a wire-inserting mechanism, a rotary tag-holder and wire-twister movable to and from said mechanism and constructed to withdraw tags therefrom and twist the wire in the tags, means to rotate the holder and to move the same to and from said mechanism, and a tag-ejector working to and from the tag-holder.

20. In a tag-wiring machine, in combination, a wire-inserting mechanism, a reciprocating tag-holder working to and from said mechanism and having means to withdraw tags therefrom, means to reciprocate the tag-holder, an ejector working laterally with respect to the holder and having at the front end jaws adapted to grasp a tag in the holder and withdraw the same therefrom, and means to operate the ejector.

21. In a tag-wiring machine, in combination, a wire-inserting mechanism, a tag-holder and wire-twister having jaws arranged to hold the tag while the wire is being twisted, means to slide the holder and twister to and from said mechanism, an ejector slidable laterally to and from the holder and having jaws arranged to grasp a tag and remove the same from the holder, means to slide the ejector, and means to operate the jaws of the holder and of the ejector.

In testimony whereof I have signed my name to this specification in the presence of two subscribing witnesses.

JOSEPH J. ENGLERT.

Witnesses:
H. G. BATCHELOR,
SIGNA FELTSKOG.